(12) United States Patent
Nakamura

(10) Patent No.: US 7,898,578 B2
(45) Date of Patent: Mar. 1, 2011

(54) ELECTRONIC APPARATUS

(75) Inventor: Tamaki Nakamura, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1340 days.

(21) Appl. No.: 10/668,199

(22) Filed: Sep. 24, 2003

(65) Prior Publication Data

US 2004/0070673 A1    Apr. 15, 2004

(30) Foreign Application Priority Data

Sep. 25, 2002    (JP) .............................. 2002-278736

(51) Int. Cl.
*H04N 5/76*    (2006.01)
*H04N 13/04*   (2006.01)

(52) U.S. Cl. .............................. 348/231.3; 348/231.99; 348/51; 348/231.6

(58) Field of Classification Search ... 348/231.3–231.6, 348/51
See application file for complete search history.

(56) References Cited

U.S. PATENT DOCUMENTS

| | | | | |
|---|---|---|---|---|
| 6,023,277 A * | 2/2000 | Osaka et al. | ................. | 345/419 |
| 6,510,002 B1 * | 1/2003 | Tsang | ........................ | 359/465 |
| 6,963,363 B1 * | 11/2005 | Ohmura | ................... | 348/231.3 |
| 6,965,413 B2 * | 11/2005 | Wada | ........................ | 348/376 |
| 2002/0001395 A1 * | 1/2002 | Davis et al. | ................. | 382/100 |
| 2002/0030675 A1 * | 3/2002 | Kawai | ........................ | 345/204 |
| 2003/0053033 A1 * | 3/2003 | Vrachan et al. | ............... | 353/31 |
| 2003/0058354 A1 * | 3/2003 | Parulski et al. | ........... | 348/231.6 |
| 2003/0063186 A1 * | 4/2003 | Tomono | ...................... | 348/51 |
| 2003/0095306 A1 * | 5/2003 | Divelbiss et al. | ............ | 359/115 |

FOREIGN PATENT DOCUMENTS

| | | |
|---|---|---|
| JP | 8-317425 A | 11/1996 |
| JP | 9-330022 A | 12/1997 |
| JP | 10-108152 A | 4/1998 |
| JP | 2000-228778 A | 8/2000 |

(Continued)

OTHER PUBLICATIONS

Roberts, J.W. et al., "Display Characteristics and the Impact on Usability for Stereo," Proceedings of the SPIE, SPIE, Bellingham, VA, US, vol. 3957, Jan. 24, 2000, pp. 128-137.

(Continued)

*Primary Examiner*—Sinh Tran
*Assistant Examiner*—Christopher K Peterson
(74) *Attorney, Agent, or Firm*—Birch, Stewart, Kolasch & Birch, LLP

(57) ABSTRACT

An electronic apparatus that facilitates determining whether image data is representing a 2D image or a 3D image and determining a type of image data, is provided. When image data is obtained, the electronic apparatus memorizes, in addition to the image data and a filename thereof, a dimension of an image represented by the image data and a type of the image data as an attribute thereof. The electronic apparatus also creates from the image data and memorizes image data representing a thumbnail image, and displays the thumbnail images arranged in a list view so that a content of the image represented by the image data is easily recognized. It is also possible to provide the thumbnail image data representing a 3D image.

7 Claims, 13 Drawing Sheets

FOREIGN PATENT DOCUMENTS

| | | |
|---|---|---|
| JP | 2001-251403 A | 9/2001 |
| JP | 2001-333437 A | 11/2001 |
| JP | 2002-232680 A | 8/2002 |
| KP | 2000-35675 A | 6/2000 |

OTHER PUBLICATIONS

Woods, A.J., "Electronic Stereoscopic Presentations—What Tools are Available and What Tools are Needed," Proceedings of the SPIE, SPIE, Bellingham, VA, US, vol. 4297, 22 Jan. 2001, pp. 111-116.

* cited by examiner

DISPLAY IN 2D MODE

L: LEFT   R: RIGHT

DISPLAY IN 2D MODE

DISPLAY IN 2D MODE

L: LEFT

DISPLAY IN 3D MODE

DISPLAY IN 2D MODE

FIG. 10

| SYMBOL | CODE WORD ASSIGNMENT | FUNCTIONS |
|---|---|---|
| SOI | 0 x FFD8 | START OF IMAGE |
| DHT | 0 x FFC4 | DEFINE HUFFMAN TABLE |
| DQT | 0 x FFDB | DEFINE QUANTIZATION TABLE |
| APP$_0$ | 0 x FFE0 | DEFINE APPLICATION JFIF FORMAT |
| SOF$_0$ | 0 x FFC0 | BASIC FUNCTION DCT |
| SOS | 0 x FFDA | START OF SCAN |
| EOI | 0 x FFD9 | END OF IMAGE |

FIG. 14

| IMAGE TYPE | EXTENSION | ACQUISITION METHOD | WHEN PRODUCING IMAGE | WHEN STORING IN MEMORY | | | WHEN ATTACHING TO E-MAIL | |
|---|---|---|---|---|---|---|---|---|
| | | | COPYRIGHT INFORMATION | COPYRIGHT ATTRIBUTE | 2D/3D ATTRIBUTE | IMAGE TYPE | ATTACHMENT | JUDGMENT CRITERIA |
| JPEG (2D) | JPG | INTERNET | YES | YES | 2D | JPEG | NOT ALLOWED | COPYRIGHT ATTRIBUTE |
| | | SELF-MADE (PHOTOGRAPHED) | NO | NO | 2D | JPEG | ALLOWED | COPYRIGHT ATTRIBUTE AND 2D ATTRIBUTE |
| JPEG (3D) | STJ | INTERNET | YES | YES | 3D | JPEG | NOT ALLOWED | COPYRIGHT ATTRIBUTE OR 3D ATTRIBUTE |
| | | SELF-MADE (COMPUTATION) | NO | NO | 3D | JPEG | NOT ALLOWED | 3D ATTRIBUTE |
| E. ANIMATION (2D) | NVA | INTERNET | YES | YES | 2D | NVA | NOT ALLOWED | COPYRIGHT ATTRIBUTE OR IMAGE TYPE |
| | | SELF-MADE (2D FRAMES) | NO | NO | 2D | NVA | NOT ALLOWED | COPYRIGHT ATTRIBUTE OR IMAGE TYPE |
| E. ANIMATION (3D) | NVA | INTERNET | YES | YES | 3D | NVA | NOT ALLOWED | COPYRIGHT ATTRIBUTE OR IMAGE TYPE |
| | | SELF-MADE (3D FRAMES) | NO | NO | 3D | NVA | NOT ALLOWED | COPYRIGHT ATTRIBUTE OR IMAGE TYPE |

ELECTRONIC APPARATUS

CROSS-REFERENCE TO RELATED APPLICATION

This Nonprovisional application claims priority under 35 U.S.C. §119(a) on Patent Application No. 2002-278736 filed in Japan on Sep. 25, 2002, the entire contents of which are hereby incorporated by reference.

BACKGROUND OF THE INVENTION

1. Field of the Invention

The present invention relates to an electronic apparatus capable of displaying an image stereoscopically observed based on parallax image data for left and right eyes respectively.

2. Description of the Related Art

Mobile telephones capable of connecting to the Internet through a telephone function thereof are coming into widespread use. As is the case for a personal computer, the mobile telephones of this kind are capable of downloading information or sending and receiving an e-mail message having a file attached thereto via the Internet. Many of these mobile telephones are equipped with a relatively large display device for displaying images and capable of displaying images represented by image data that is downloaded or attached to an incoming e-mail message. It is also a practice to equip the mobile telephones with a camera and thereby, making it possible to display a photographed image and transmit the image data thereof by attaching to e-mail.

In recent years, image data representing left and right parallax images have been provided via the Internet, and therefore, mobile telephones for displaying not only 2D images but also stereoscopic 3D images are suggested (e.g., Japanese Patent Application Laid-Open No. 2001-251403). The mobile telephones of this kind have a display device on which settings are changed for displaying the 2D image and the 3D image.

Furthermore, technologies for generating 3D image data representing a stereoscopic image from 2D image data representing an image photographed by a camera have been also developed (e.g., Japanese Patent Application Laid-Open No. 2000-228778). It is desirable that the mobile telephones be compact in size and light in weight. Therefore, because it is impractical to configure such a mobile telephone with two cameras so as to photograph images for left and right eyes respectively, the technologies for generating 3D image data from 2D image data are suitable for the mobile telephone.

Image data is handled as a file, and the file is given a filename composed of a name for identifying an image thereof and an extension for showing a type of image, i.e., a format of image data. The image data is usually compressed and brought back by decompression, a reversal process of compression, into a format suitable for displaying, because the image data is formed with a large amount of data. The compression is usually performed by the JPEG method, and "JPEG" or "JPG" is given as an extension of the filename in this case. The file is written with information of its image size (number of pixels) together with the image data itself. Furthermore, information relating to the copyright such as an author's name is added to a file of image data that is provided through the Internet.

When an image is displayed or image data is attached to an e-mail message, a user can display a list of files and select the image data. However, it is inconvenient to display only the filenames, because the contents of the images representing the image data are difficult to recognize. Because of this, it has been practiced to create image data representing a scale-down image of an original image, from original image data and to display these scale-down images by arranging side by side. The image scaled down in this way is called a thumbnail image. Image data of the thumbnail image is created by extracting pixel data at intervals from the original image data, in other words, by thinning out the original image data. When the thumbnail images are arranged side by side on display, the user can immediately recognize the content of the image represented by each of many image data, and accordingly, this can make the user's selection extremely easier.

As described above, it is possible to attach image data to an e-mail message and transmit it. However, it has not been long since a mobile telephone capable of displaying 3D images were suggested and, therefore, it is rather difficult to say that such mobile telephones are in widespread use. Because of this reason, even if image data representing a 3D image is attached to an e-mail message and transmitted as is the case for image data representing a 2D image, there is no guarantee that a recipient can make use of such an image. It will be a waste of communication cost for an individual user and socially, a waste of public communication service to attach to an email message and send such image data that may not be used at the recipient side. To avoid such a case, the user alone must pay an attention when image data is attached to an e-mail message. As a result, a burden placed on the user becomes heavier.

There exists a system that adds an identical extension to the files without distinguishing between the 2D image data and the 3D image data. In that system, it is impossible to determine from the extension of the filename if the image data is for the 2D image or the 3D image. In this case, it is necessary to determine if the image data is for the 2D image or the 3D image based on the image data itself. This way will cause a delay in changing the settings on the display device for displaying between the 2D image and the 3D image and deterioration in processing efficiency.

On top of this, it is also possible that the user changes or deletes the extension of the filename by mistake. In this case, it will be impossible to learn the type of image from the extension of the filename. Therefore, it also becomes necessary to determine the type of image based on the content of the image data, thereby causing deterioration in processing efficiency.

SUMMARY OF THE INVENTION

An object of the present invention is, in light of the drawbacks of the conventional technologies, to provide an electronic apparatus such as a mobile telephone that facilitates determining whether image data represents a 2D image or a 3D image and determining a type of image data.

To achieve the above object, according to one aspect of the present invention, an electronic apparatus for obtaining and memorizing image data representing an image and displaying the image represented by the memorized image data, comprises a memory for memorizing, in addition to the image data, an attribute about a dimension of the image represented by the obtained image data depending on whether the image data represents a two dimensional image without parallax or a three dimensional image with parallax.

In addition to memorizing the image data and an extension of filename, the electronic apparatus memorizes, as an attribute, information as to whether the image represented by the image data is for a two dimensional image or a three dimensional image. As a result, it becomes possible to securely determine the dimension of the image even if the dimension of the image can not be determined from the extension of filename. Furthermore, the processing efficiency is enhanced, because the dimension of the image is determined without referring to the image data itself For example, it becomes possible to swiftly change settings of a display device that is configured in such a way that the settings are changed when a two dimensional image is displayed and when a three dimensional image is displayed.

The above-mentioned electronic apparatus is configured in such a way that it is capable of connecting to the Internet and obtain the image data therethrough.

It is also possible to configure the electronic apparatus in such a way that it has a camera for photographing an image and the image data is thus obtained using the camera.

To achieve the above object, according to another aspect of the present invention, an electronic apparatus for obtaining and memorizing image data representing an image and displaying the image represented by the memorized image data, comprises a memory for memorizing, in addition to the image data, an attribute about a format of the image data.

This electronic apparatus memorizes, in addition to the image data and an extension of filename, a format of image data, i.e., a type of image as an attribute. As a result, it becomes possible to securely determine the type of image even if the extension of filename is changed or deleted. In addition, it makes it possible to categorize the images to such an extent that is not achieved by using the extension of filename alone. Moreover, it is also possible to swiftly determine the type of image without referring to the image data itself

BRIEF DESCRIPTION OF THE DRAWINGS

This and other objects and features of the present invention will become clear from the following description, taken in conjunction with the preferred embodiments with reference to the accompanying drawings in which:

FIG. 10 is a diagram showing parameters used in the compression process based on the JPEG method;

FIG. 14 is a diagram showing judgment criteria used in the mobile telephone for determining whether or not the image data can be attached to e-mail.

DESCRIPTION OF THE INVENTION

Figure 1:
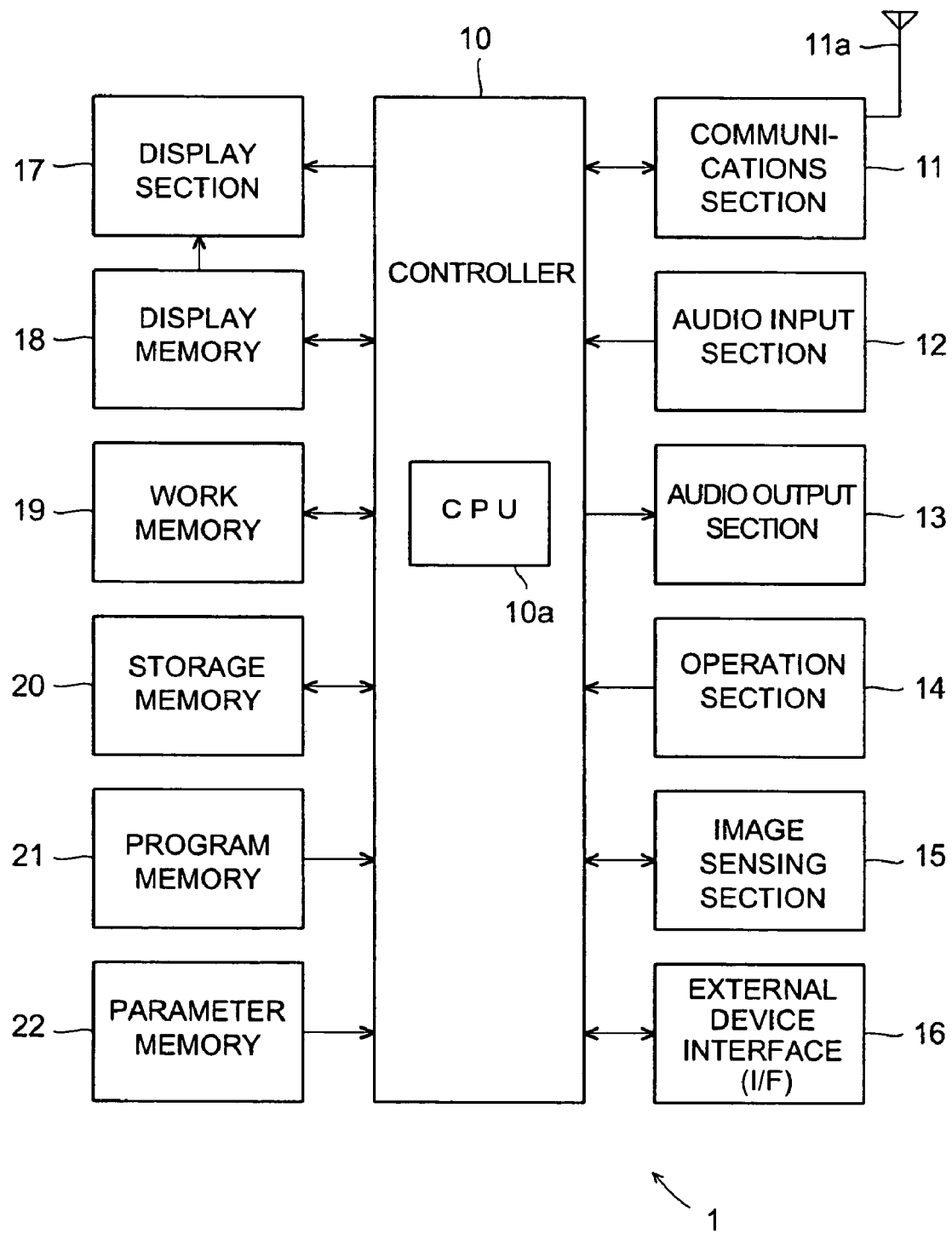
FIG. 1 is a schematic block diagram showing a simplified configuration of a mobile telephone embodying the present invention.

Hereinafter, a mobile telephone embodying the present invention will be described with reference to the drawings. A simplified configuration of the mobile telephone embodying the invention is shown schematically in FIG. 1. The mobile telephone 1 comprises a communications section 11, an audio input section 12, an audio output section 13, an operation section 14, an image sensing section 15, an external device interface (I/F) 16, a display section 17, and a controller 10.

The communications section 11 superimposes signals to be transmitted on a carrier wave and transmits them via an antenna 11a, and extracts signals from the carrier wave received by the antenna 11a. The audio input section 12 receives audio to be transmitted. The audio output section 13 outputs received audio. The operation section 14 is equipped with some keys corresponding to numerals, characters, or predetermined functions, and is operated by a user for entering telephone numbers, strings of characters, and operational instructions. The keys on the operation section 14 include four cursor keys for moving a cursor (a pointer) displayed on the display section 17 up and down or left and right.

The image sensing section 15 comprises a camera including a CCD area sensor and a lens for forming light thereon and is used for photographing images. The external device interface 16 can be connected to other devices such as a personal computer by a communication cable through which communications therewith are performed. The display section 17 comprises a liquid-crystal display device and displays characters and images. The image photographed by the image sensing section 15 is displayed on the display section 17.

The controller 10 controls an overall operation of the mobile telephone 1 and processes audio and image data to be transmitted and received as well. The controller 10 includes a CPU 10a, and controls and various types of processing are performed largely by the CPU 10a.

The mobile telephone 1 has functions of, by connecting to the Internet, downloading information from a web page and sending and receiving e-mail. It is possible to attach various kinds of files to an outgoing e-mail message and receive an incoming e-mail message with various kinds of files attached thereto, and these files include those written with image data. The downloaded information also includes image data. It is possible to display on the display section 17 the image represented by the image data downloaded or attached to the incoming e-mail message as is the case for the image photographed by using the image sensing section 15.

The mobile telephone 1 has, in addition to the above-mentioned sections, a display memory 18, a work memory 19, a storage memory 20, a program memory 21, and a parameter memory 22. The display memory 18 memorizes temporarily the image data representing the image to be displayed on the display section 17. The work memory 19 memorizes temporarily information necessary for the CPU 10a of the controller 10 to perform controlling and to process the image data. The storage memory 20 memorizes and stores the image data. As the storage memory 20 is formed with a flash memory, it is rewritable and does not lose a content memorized therein even when power is not supplied thereto.

The program memory 21 memorizes a program describing operations of the CPU 10a and the parameter memory 22 memorizes parameters to be used by the CPU 10a to perform controlling and to process the image data. The program memory 21 and the parameter memory 22 are formed with a ROM and, therefore, do not lose a content memorized therein even when power is not supplied thereto.

Figure 2A:
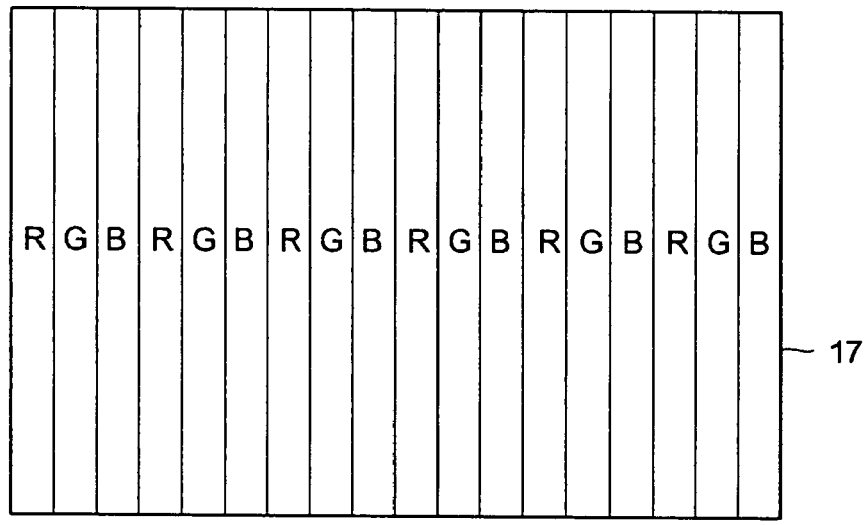
FIGS. 2A and 2B are schematic diagrams showing a principle for displaying a 2D and a 3 D image respectively in the mobile telephone.
Figure 2B:
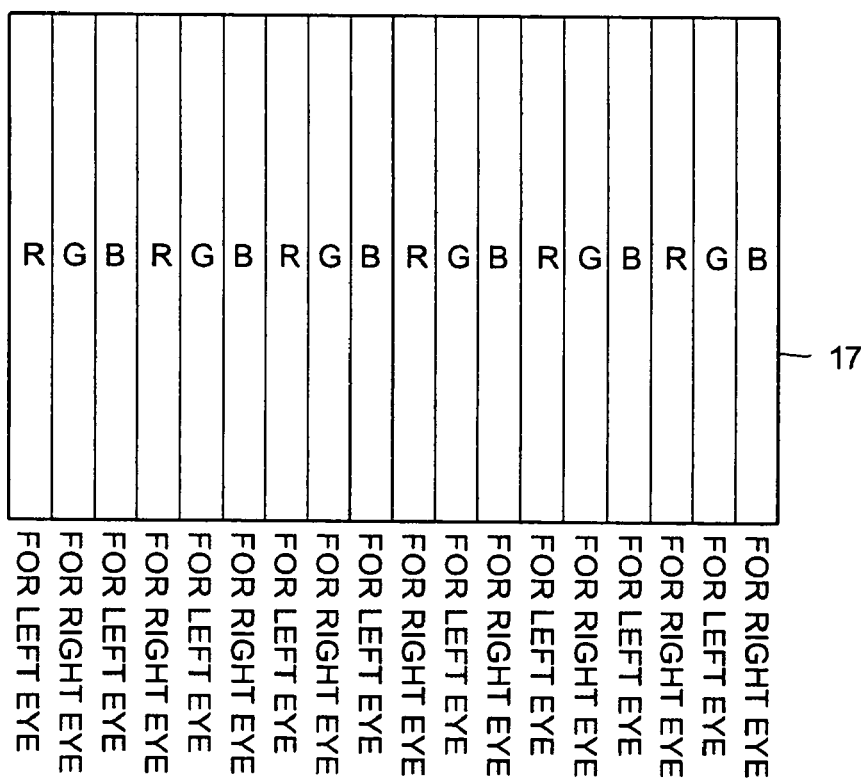

The mobile telephone has functions of, in addition to displaying a plane 2D image based on a single image data, displaying a stereoscopic 3D image based on two kinds of image data representing left and right parallax images respectively. A principle for displaying these images is shown in FIG. 2A and FIG. 2B.

The liquid-crystal display device of the display section 17 is a translucent type composed of a pixel (called R pixel) group having a filter for allowing red (R) light to pass selectively and displaying a red component of the image, a pixel (called G pixel) group having a filter for allowing green (G) light to pass selectively and displaying a green component of the image, and a pixel (called B pixel) group having a filter for allowing blue (B) light to pass selectively and displaying a blue component of the image. As shown in FIG. 2A, each of these three pixel groups is arranged vertically so as to make a line and arranged horizontally so as to appear alternately in this order. Three pixels (R pixel, G pixel, and B pixel) arranged horizontally form a single dot of the image.

When a 2D image is displayed, the dots of the image are displayed contiguously in the vertical and the horizontal directions. Light from all of the dots is directed to both left and right eyes of the user. By contrast, when a 3D image is displayed, as shown in FIG. 2B, the image for the left eye and the image for the right eye are displayed alternately pixel by pixel in the horizontal direction. In the vertical direction, the dots of the image for the left eye as well as the dots of the image for the right eye are contiguously displayed. Light from the image for the left eye is directed to the left eye only and light from the image for the right eye is directed to the right eye only.

Figure 3:
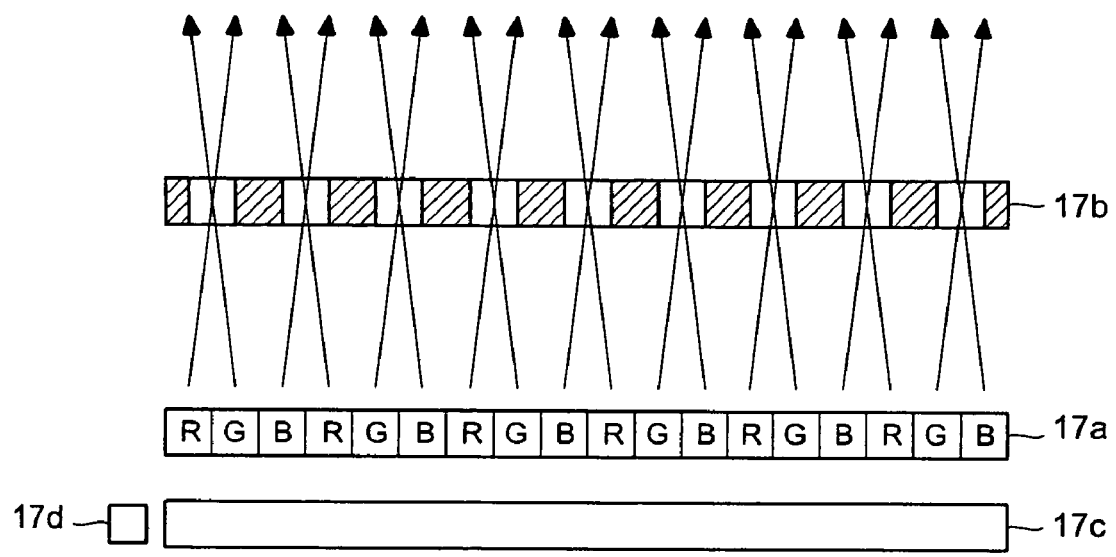
FIG. 3 is a schematic diagram for the mobile telephone showing its configuration in which light from the image for the left eye and light from the image for the right eye are selectively directed to the left and the right eyes respectively when a 3D image is provided.

A configuration by which the light from the image for the left eye and the light from the image for the right eye are selectively directed to the left and the right eyes respectively when a 3D image is provided, is shown schematically in FIG. 3. The display section 17 comprises two translucent liquid-crystal panels 17a and 17b, a light-guiding plate 17c, and a light source 17d. The light source 17d emits white light and directs the emitted light to enter into the light-guiding plate 17c through an edge thereof The light-guiding plate 17c, while guiding the light incident from the edge to cause total internal reflection when the light hits upper and lower surfaces thereof so that the light travels towards another edge thereof, allows the light to travel across the upper surface because of asperities arranged on the upper or the lower surface of the light-guiding plate 17c.

The liquid-crystal panel 17a is for displaying the image and comprises the aforementioned R pixel, G pixel, and B pixel groups. The light from the light-guiding plate 17c is modulated by the liquid-crystal panel 17a to become the light representing the image. Here, although not illustrated, polarizing plates each facing top and bottom surfaces of the liquid-crystal panel 17a are arranged.

The liquid-crystal panel 17b has transparent electrodes (not illustrated) extending in a vertical direction (a direction perpendicular to a plane of a paper illustrating FIG. 3), and light-shielding portions in a stripe pattern are emerged as shown by hatch lines when voltage is applied. The liquid-crystal panel 17b is positioned so that each of the light-shielding portions thereof faces between the pixels of the liquid-crystal panel 17a. Among the pixels arranged horizontally on the liquid-crystal panel 17a, light from an odd-numbered pixel is blocked by the light-shielding portions of the liquid-crystal panel 17b and prevented from reaching the right eye, and reaches the left eye only. On the contrary, light from an even-numbered pixel is blocked by the light-shielding portions and prevented from reaching the left eye, and reaches the right eye only. In this way, a 3D image is provided to the user by displaying alternately, pixel by pixel, the images for the left eye and for the right eye.

When a 2D image is displayed, voltage is not applied to the liquid-crystal panel 17b and, thereby the light-shielding portions are not allowed to emerge. In this case, the light from all of the pixels on the liquid-crystal panel 17a reach both the left and the right eyes. A state of displaying the 2D image in these settings is referred to as a 2D mode and a state of displaying the 3D image in the settings as shown in FIG. 3 is referred to as a 3D mode.

Among image data downloaded through the Internet or attached to the incoming email, there are those image data that represent a 2D image and those image data that represent a 3D image. The layout of the image data representing the 3D image is shown schematically in FIG. 4. Each of the image data for the left eye and the right eye is half in size of the image data representing the 2D image. The image data for the left eye and the image data for the right eye are arranged side by side in every horizontal line. Within each image data, a set of data for R pixel, G pixel, and B pixel (each called R pixel data, G pixel data, and B pixel data) representing a dot of the image is positioned side by side horizontally.

Figure 4:
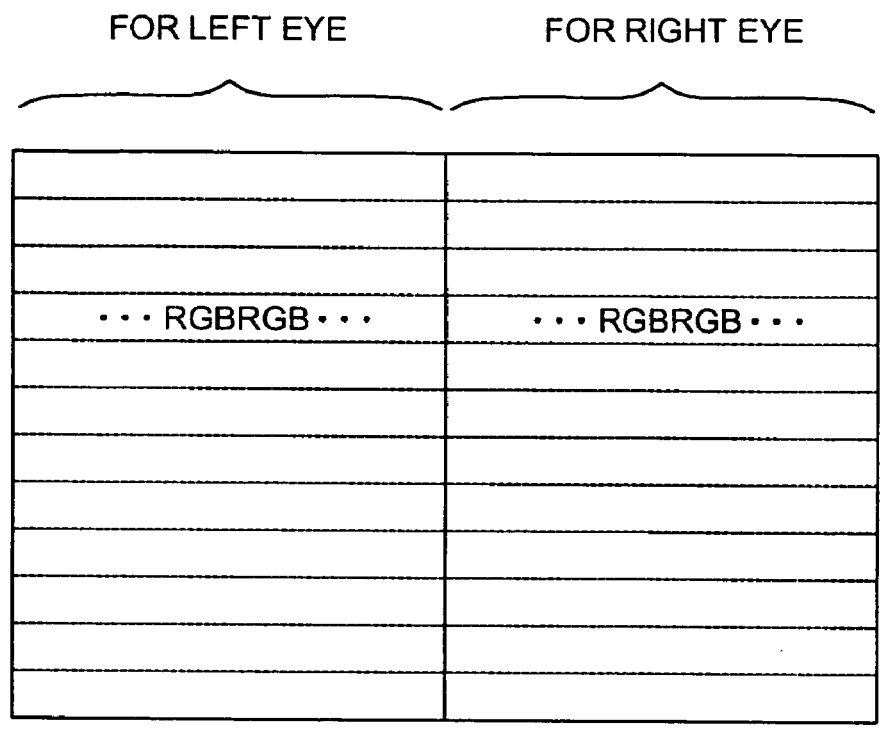
FIG. 4 is a schematic diagram showing a typical layout of the image data representing a 3D image.
Figure 5A:
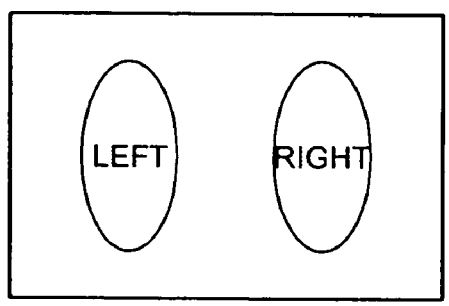
FIGS. 5A and 5B are schematic diagrams showing examples of displayed images based on the image data representing a 3D image.
Figure 5B:
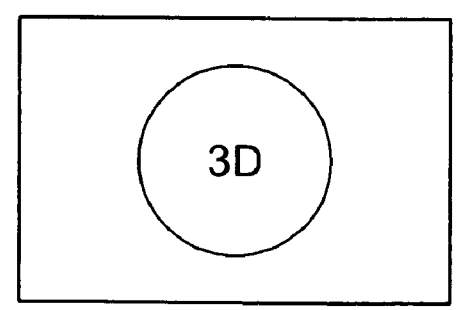

When the image is displayed based on these image data, the image for the left eye and the image for the right eye are displayed as a left image and a right image separately as shown in FIG. 5A. Because of this reason, it is not that the image data shown in FIG. 4 are used as they are, but that the horizontal layout thereof is rearranged so that the image data for the left eye and the image data for the right eye are positioned alternately side by side for each pixel data. When the image data is displayed after this rearrangement, the image for the left eye and the image for the right eye are merged and displayed as shown in FIG. 5B. The stereoscopic image is provided to the user by displaying these images in the 3D mode.

The mobile telephone 1 has a function of generating image data representing a 3D image from image data representing a 2D image. This can be achieved by extracting every other set among the sets each comprising R pixel data, G pixel data, and B pixel data from the 2D image data so as to make the image data for the left eye. Then, the image data for the right eye is produced by positioning the set comprising R pixel data, G pixel data, and B pixel data included in the image data for the left eye in such a way that the closer the set is situated to the ends in the horizontal direction, the more the set is shifted towards the right end. As a result of this function, it is possible to obtain the image data representing the 3D image from the 2D image data downloaded through the Internet or the image data representing the image photographed by using the image sensing section 15 and thus provide the 3D image.

In describing the embodiment of the present invention, although the left is referred to as the primary and the right is referred to as the secondary, either of them can be the primary. The "left" and the "right" are interchangeable in context of the description.

The mobile telephone 1 memorizes many pieces of image data as individual files in the storage memory 20 thereof. In doing so, to the file of the image data downloaded through the Internet or attached to an incoming e-mail message, a filename that has been added to the original file is given, and to the file of the image data representing the image photographed by using the image sensing section 15, a predetermined filename is given. The user can change these filenames freely.

The user can display the filenames in list form and select a desired one on the display section 17 when displaying the image represented by the memorized image data on the display section 17 and transmitting the memorized image data by attaching to an e-mail message. The mobile telephone 1 also has a function of displaying thumbnail images in a list view form in order to make a selection by the user easier. The image data representing the thumbnail image has been created from the image data downloaded through the Internet or the image data representing the image photographed by using the image sensing section 15, and the resultant image is memorized within the file of the original image data together with the original image data.

The thumbnail image can be a 2D image or a 3D image. Examples of the thumbnail images are shown in FIG. 6A to FIG. 6E. In these drawings, a thumbnail image indicated by a triangle shape shows that the original image data represents a 2D image, and a thumbnail image indicated by a circular or an oval shape shows that the original image data represents a 3D image. All the thumbnail images are displayed in plane view in the 2D mode or in stereoscopic view in the 3D mode.

Figure 6A:
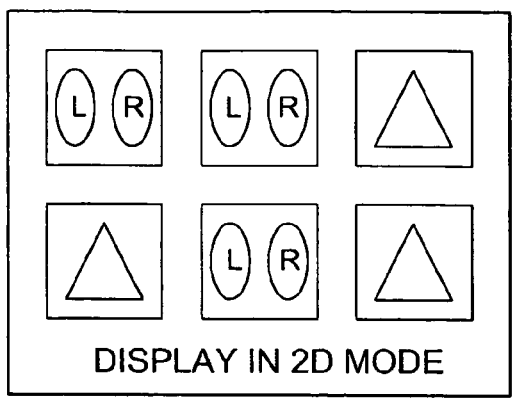
FIGS. 6A to 6E are schematic diagrams showing examples of thumbnail images displayed by the mobile telephone.
Figure 6D:
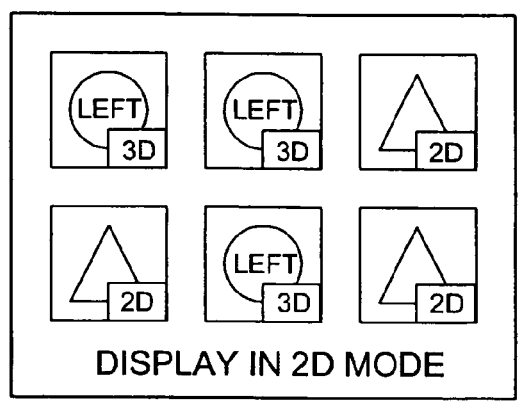
Figure 6B:
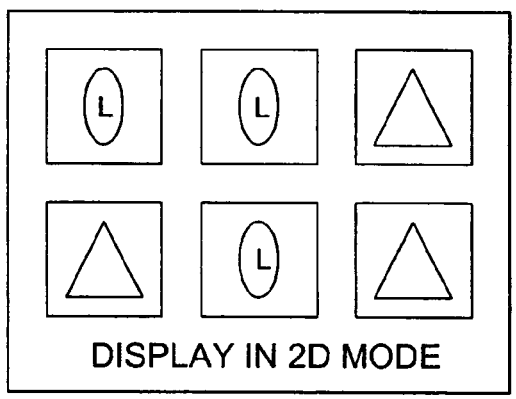
Figure 6E:
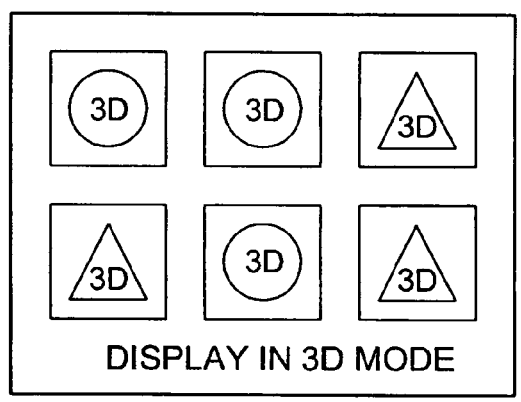

FIG. 6A to FIG. 6D show examples of the thumbnail images in the 2D mode, and FIG. 6E shows examples of the thumbnail images in the 3D mode. In either of the examples, the thumbnail images created from the image data representing the 2D images and the 3D images respectively are intermingled with each other.

Figure 6C:
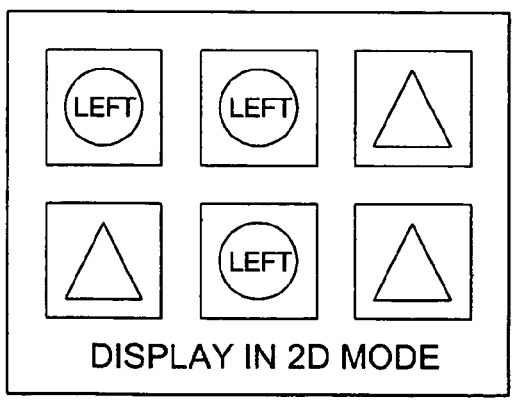

The image data representing the thumbnail image is produced by extracting (thinning out) a set composed of R pixel data, G pixel data, and B pixel data from a plurality of sets. There are three ways for producing the image data representing the 2D thumbnail image when the original image data represents the 3D image. First, as shown in FIG. 6A, it can be produced from the layout of the data in its entirety shown in FIG. 4. It is also possible, as shown in FIG. 6B, to produce only from the image data for the left eye among the layout of the data shown in FIG. 4. Furthermore, it is also possible, as shown in FIG. 6C, to produce only from the image data for the left eye by reducing the extraction rate in the horizontal direction to a half.

When the image data of the thumbnail image is produced only from the image data for the left eye, it is difficult for the user to identify whether the original image data thereof represents a 2D image or a 3D image. Therefore, it is desirable that a symbol indicating a dimension of the image representing the original image data be displayed together with each thumbnail image. FIG. 6D is a schematic diagram with symbols such as "2D" and "3D" added to the illustration shown in FIG. 6C.

When the original image data represents the 3D image, the thumbnail image data representing the 3D image is created, as explained before, by converting the layout of the data as shown in FIG. 4 to such a format in which the pixel data for the left eye and the pixel data for the right eye are laid alternately side by side, and by arranging thus converted image data. Also, when the original image data represents the 2D image, creating the thumbnail image data representing the 3D image includes steps of producing the image data for the left eye by extracting data from the original image data, generating the image data for the right eye from this image data for the left eye, further, converting into a form in which the pixel data for the left eye and the pixel data for the right rye are laid alternately side by side, and arranging thus converted image data.

Furthermore, when the original image data represents the 2D image, it is possible to produce the image data for the left eye by extracting data from the original image data, make the image data for the right eye by duplicating the image data for the left eye in its entirety, convert into a form in which the pixel data for the left eye and the pixel data for the right rye are laid alternately side by side, and arrange thus converted image data. These steps can provide the image without parallax to the left and the right eyes, i.e., the 2D image for displaying in the 3D mode.

The size of the thumbnail image is fixed and therefore, its image data size (number of pixels) is also fixed. On the other hand, while the size of the image photographed by using the image sensing section 15 is fixed, the size of the image obtained through the Internet varies depending on the providers thereof Therefore, it is necessary to take the size of the original image into consideration when the image data representing the thumbnail image is produced. The followings describe specifically how the image data of the thumbnail image is produced.

First, a ratio of the size (number of pixels) of the original image in the horizontal direction to the size (number of pixels) of the thumbnail image in the horizontal direction and a ratio of the size (number of pixels) of the original image in the vertical direction to the size (number of pixels) of the thumbnail image in the vertical direction are calculated. Then, intermediate image data is generated by extracting the pixel data from the original image data in accordance with the smaller ratio. The intermediate image data has an image size equal to that of the thumbnail image in a direction in which the ratio is smaller. Next, a surplus data portion of the intermediate image data exceeding the size of the thumbnail image in a direction in which the ratio is bigger is deleted. In this way, the image data representing the thumbnail image of a fixed size can be obtained regardless of the size of the original image data.

Figure 7:
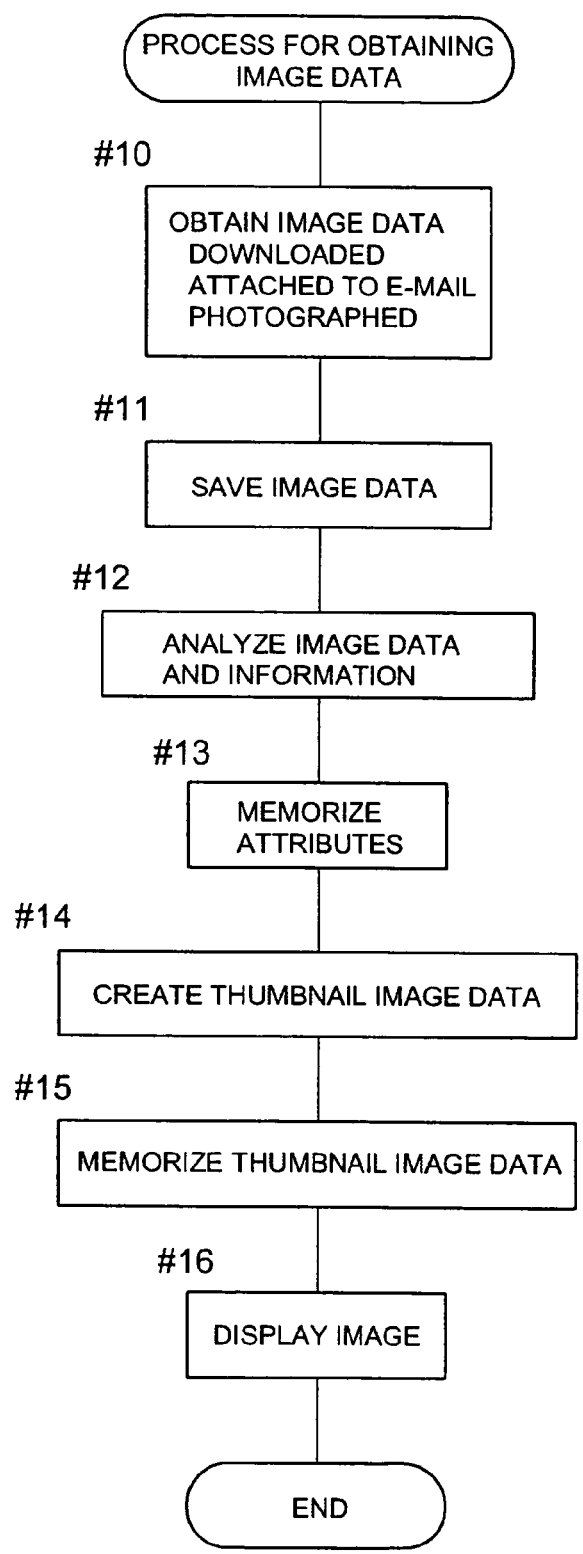
FIG. 7 is a flowchart showing a simplified flow of processes performed by the mobile telephone when image data is obtained.

A simplified flow of processes by the mobile telephone 1 when image data is obtained is shown in FIG. 7. First, image data is obtained by downloading through the Internet, receiving an e-mail message, or photographing by using the image sensing section 15 (step #10), and the image data thus obtained is memorized as a file in the storage memory 20 (#11). Next, information added to the obtained image data, a filename thereof, and a file are analyzed to obtain such information as a type of the image data (format), a dimension of the image data, and a copyright (#12), and these pieces of information thus obtained are memorized in the file of the image data as an attribute thereof (#13). Furthermore, image data representing a thumbnail image is created from the obtained image data (#14), and the image data is memorized in the file of the original image data (#15). Lastly, an image representing the obtained image data is displayed on the display section 17 either in the 2D mode or 3D mode in accordance with the dimension of the obtained image data (#16).

Figures 8A, 8B:
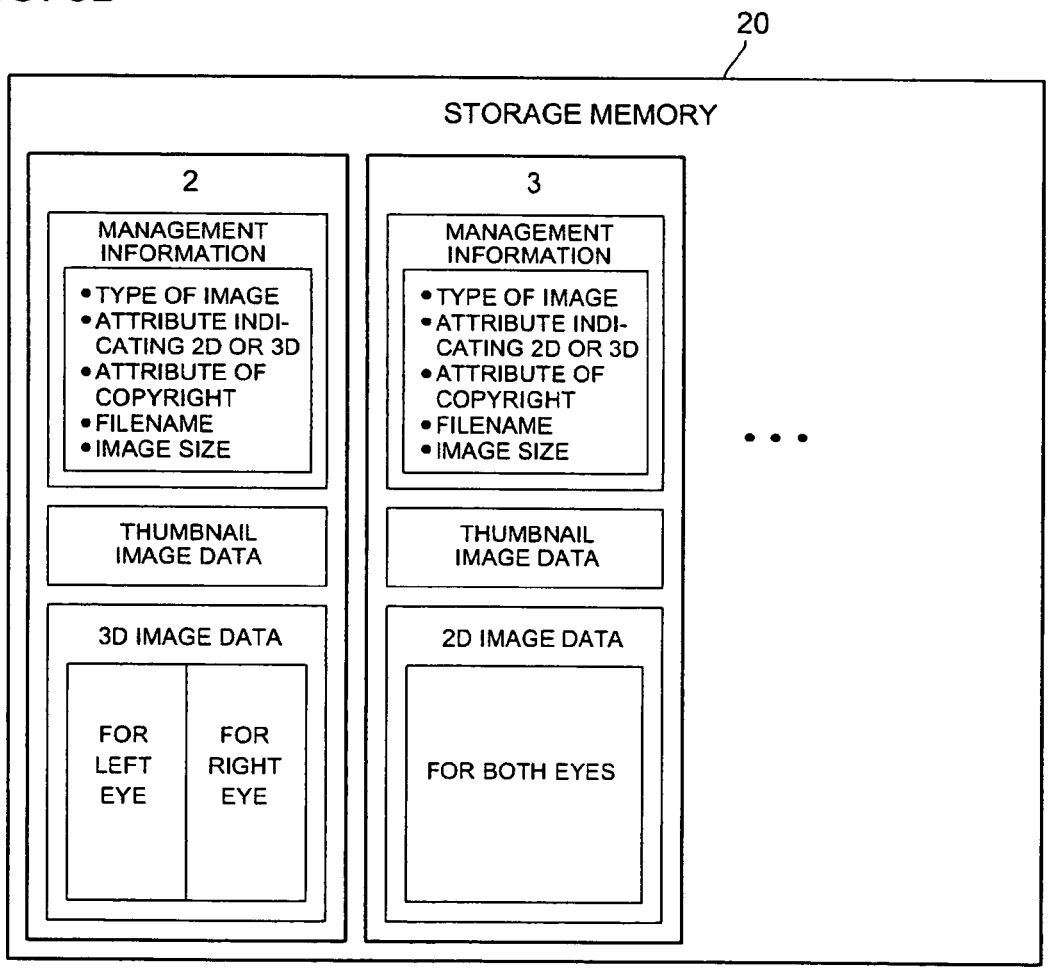
FIGS. 8A and 8B are schematic diagrams showing structures of data memorized in a work memory and a storage memory of the mobile telephone respectively.

The processes in steps #12 and #13 use the work memory 19. Structures of the memorized contents in the work memory 19 and the storage memory 20 are shown schematically in FIG. 8A and FIG. 8B respectively. As shown in FIG. 8B, a file for each image data is memorized and the files thus memorized have consecutive numbers. Here, the illustration shows an example when a file numbered "1" has been deleted and is not present.

Each individual file in the storage memory 20 is composed of management information, thumbnail image data, and image data. The management information includes a type of image (format), an attribute of image dimension, an attribute of copyright, a filename, and an image size (numbers of pixels in the image data in the horizontal and in the vertical directions). The thumbnail image data is compressed and memorized with an addition of information regarding the compression process. Furthermore, the image data was compressed when it was obtained and is memorized as it is together with the information regarding the compression process. The image data represents either a 2D image or a 3D image as described before.

The management information for all the files of image data stored in the storage memory 20 and an image data number for the first image data are memorized in the work memory 19. Moreover, the image data number for the next image data is memorized for each of the management information of image data. According to the example shown in FIG. 8A, the image data number for the first image data (image number) is "2" and the second image data indicates that the next image data number is "3." The management information of the last image data memorizes "0" as the next image data number (not illustrated). Furthermore, when image data is obtained through the Internet, information having been added thereto and indicating the type of image (format) and the copyright is memorized in a predetermined area in the work memory 19 (not illustrated).

The controller 10 reads out the management information for all the image data from the storage memory 20 and stores it in the work memory 19 when the power supply is turned on. Thereafter, the work memory 19 is referred to for managing each of the files stored in the storage memory 20. For the management, the image data number is used. Whenever a file is deleted from the storage memory 20, its corresponding management information will be deleted from the work memory 19 and the next image number memorized in the work memory 19 will be updated accordingly. In addition, when new image data is memorized in the storage memory 20, the management information thereof will be memorized in the work memory 19 and the next image number memorized in the work memory 19 will be updated accordingly.

Generally speaking, image data provided through the Internet is compressed in accordance with the JPEG method and therefore, image data of the image photographed by using the image sensing section 15 will be compressed in accordance with the JPEG method. However, a filename of JPEG-type image data provided through the Internet has an extension as "JPEG" or "JPG" for indicating a 2D image and "STJ" for indicating a 3D image. According to this practice, in the mobile telephone 1, "JPEG" or "JPG" is given as an extension of filename for the image data representing a 2D photographed image and "STJ" is given as an extension of filename for the image data representing a 3D image generated from that 2D image data.

The mobile telephone 1 has a function of displaying smooth motion images by generating image data representing some images each corresponding to a mid-motion image from two or more image data representing motion images. These images are called electronic animation. The electronic animation includes the plane 2D images and the stereoscopic 3D images. Furthermore, the image data for the electronic animation is provided through the Internet. The image data for electronic animation is also compressed in accordance with the JPEG method. However, the image data for electronic animation, regardless of whether it represents the 2D image or the 3D image, is given a filename with an extension "NVA." According to this practice, in the mobile telephone 1, "NVA" is given as an extension of filename to all the image data for electronic animation.

Figure 9:
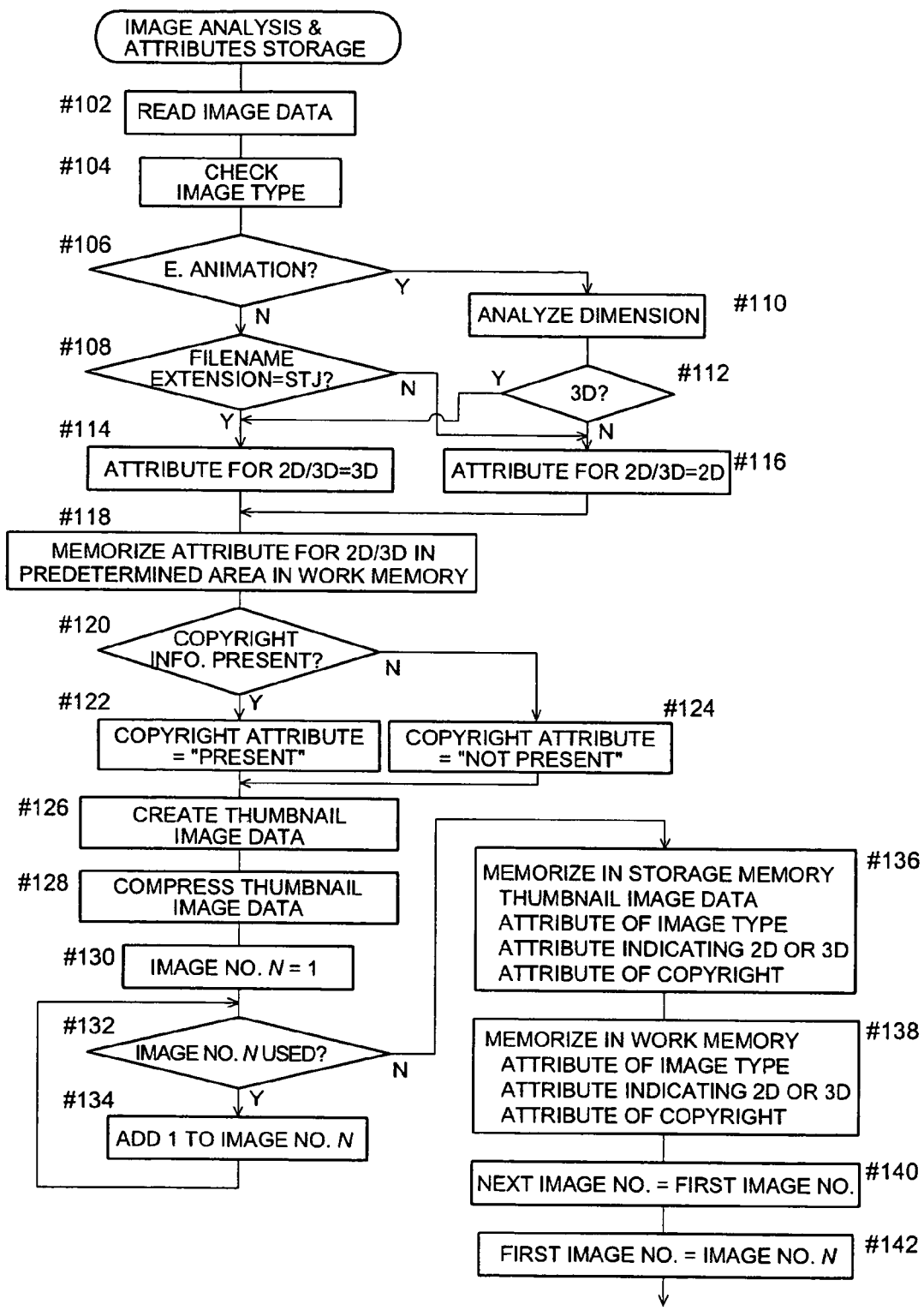
FIG. 9 is a flowchart showing detailed processes performed in step #12 to step #15 among the processes shown in FIG. 7 performed when image data is obtained.

FIG. 9 shows more detailed processes described in step #12 to step #15 among the steps included in the process for obtaining image data shown in FIG. 7. First, image data is read from the storage memory 20 (step #102). When the image data is read out, it is decompressed according to the information regarding the compression process added to the image data. Then, the aforementioned predetermined area in the work memory 19 is referred to and the type of image is checked (#104). As nothing is memorized in the predetermined area of the work memory 19, if the image data is obtained by photographing using the image sensing section 15, then the type of image will be "JPEG."

After that, the image data is analyzed and checked to see whether or not the image thereof is for electronic animation (#106). If it is not for electronic animation, then the filename thereof is checked to see if the extension thereof is "STJ" or not (#108). If the extension is "STJ", then the attribute indicating 2D or 3D is set to "3D" (#114). Otherwise, the attribute indicating 2D or 3D is set to "2D" (#116). The attribute indicating 2D or 3D is memorized in a predetermined area in the work memory 19 (#118). If the image data is for electronic animation, then the image data is analyzed to determine if it is 2D image data or 3D image data (#110). If it is the 3D image data, then the attribute indicating 2D or 3D is set to "3D" (#114). If it is the 2D image data, then the attribute indicating 2D or 3D is set to "2D" (#116).

Thereafter, the aforementioned predetermined area of the work memory 19 is referred to for the presence of the information of copyright (#120). If it is present, then the attribute of copyright is set to "present" (#122). If it is not present, then the attribute of copyright is set to "not present" (#124). Furthermore, image data for the thumbnail image is produced (#126), and thus produced image data is compressed (#128).

Next, the image number N given to the image data and stored in the storage memory 20 is set to "1" (#130). Then, the work memory 19 is checked to see if the management information for the image number N is memorized therein or not (#132). If it is memorized, then "1" is added to the image number N (#134) and the process returns to step #132. If the image number N is not memorized, the compressed image data for the thumbnail image, the type of image, the attribute indicating 2D or 3D, and the attribute of copyright are memorized and saved within the file of the image data that is saved in the storage memory 20 during step #11 shown in FIG. 7 (#136). During this process, the file number (image data) is set to N. Furthermore, the type of image, the attribute indicating 2D or 3D, and the attribute of copyright are memorized in the work memory 19 as the management information (#138), and the management information number is set to N.

Moreover, the first image number at that moment is given to the next image number being added to the management information memorized in the work memory 19 (#140), and then, the first image number is set to N(#142).

In step #128, the image data for the thumbnail image is compressed according to the JPEG method. In step #136, when that image data is memorized, parameters used for the compression are also memorized so that the decompression of the image data is made possible at a later time. In this case, because the image data for the thumbnail image is used only by the mobile telephone 1, some parameters can be made constant at all times and common to all the image data. If these common parameters are saved for each image data of the thumbnail image, it will be a waste of memory area in the storage memory 20. Therefore, the common parameters requiring a large memory area are memorized in the parameter memory 22 (refer to FIG. 1) instead of being memorized for each image data.

The parameters used in the compression process based on the JPEG method are shown in FIG. 10. The compression is performed in two stages, the Huffman encoding followed by the quantization. In each stage, the Huffman table and the quantization table are used as the parameters respectively. In the mobile telephone 1, the Huffman table (symbol: DHT) is used for all the image data of the thumbnail images as the common parameters and corresponding parameters are omitted from the parameters that are otherwise added to the image data of the thumbnail image and memorized. The size of the Huffman table is about 400 bytes and equivalent to about 45% of the size (about 900 bytes) obtained by combining the image data, compressed at a standard compression rate, of a thumbnail image that is formed by 48 dots×48 dots and all the parameters. Therefore, the memorizing capacity of the storage memory 20 is largely saved by not memorizing the Huffman table for each image data. Additionally, because the quantization table (symbol: DQT) is dependant on the encoded image data obtained through the Huffman encoding, it is necessary to memorize the quantization table for each image data.

When the thumbnail image is displayed, a dequantization process is applied to the compressed image data by using the quantization table memorized therewith and thereafter, a reverse-encoding (decoding) process is applied by using the Huffman table memorized in the parameter memory 22.

All parameters including the Huffman table are memorized for the obtained image data. This is because an identical Huffman table is not shared by the image data provided through the Internet. However, it is possible not to memorize the Huffman table for each image data and instead, memorize a common Huffman table in the parameter memory 22 for use in encoding the image data obtained by photographing using the image sensing section 15. This way contributes to saving the memorizing capacity of the storage memory 20 further.

When the Huffman table is not memorized together with the image data, it is desirable to add to the image data and memorize information indicating that the Huffman table is not memorized. This way makes it clear that a common Huffman table should be added when that image data is attached to e-mail and transmitted. It is also possible to prevent the image data for which the Huffman table is not memorized from being attached to e-mail, and display, together with the thumbnail image, a message indicating that it is not attachable to e-mail, as described later. It is desirable that the information indicating that the Huffman table is not memorized be included in the management information as is the case for the aforementioned attribute indicating 2D or 3D and attribute of copyright. In this way, it is possible to make a quick decision on whether the Huffman table is memorized or not.

It is also possible to allow the image data with which the Huffman table is not memorized to be provided, as it is, to another apparatus. In this case, information indicating that the Huffman table is excluded is added to the image data. The apparatus that obtains the image data can learn from the added information that the Huffman table is excluded and can take appropriate measures.

For example, when the mobile telephone 1 obtained such image data from another mobile telephone having identical functions, it is possible to perform a decoding process using the common Huffman table and display the image represented by the obtained image data. If it is impossible to decode the image data by using the common Huffman table, it is also possible to display, e.g., an "X" mark or "unable to display" text, instead of displaying the image, and thereby indicate that the image is not displayable. Providing the image data excluding the Huffman table can contributes to reducing the traffic of communications and the time required for downloading or sending and receiving e-mail.

Figure 11:
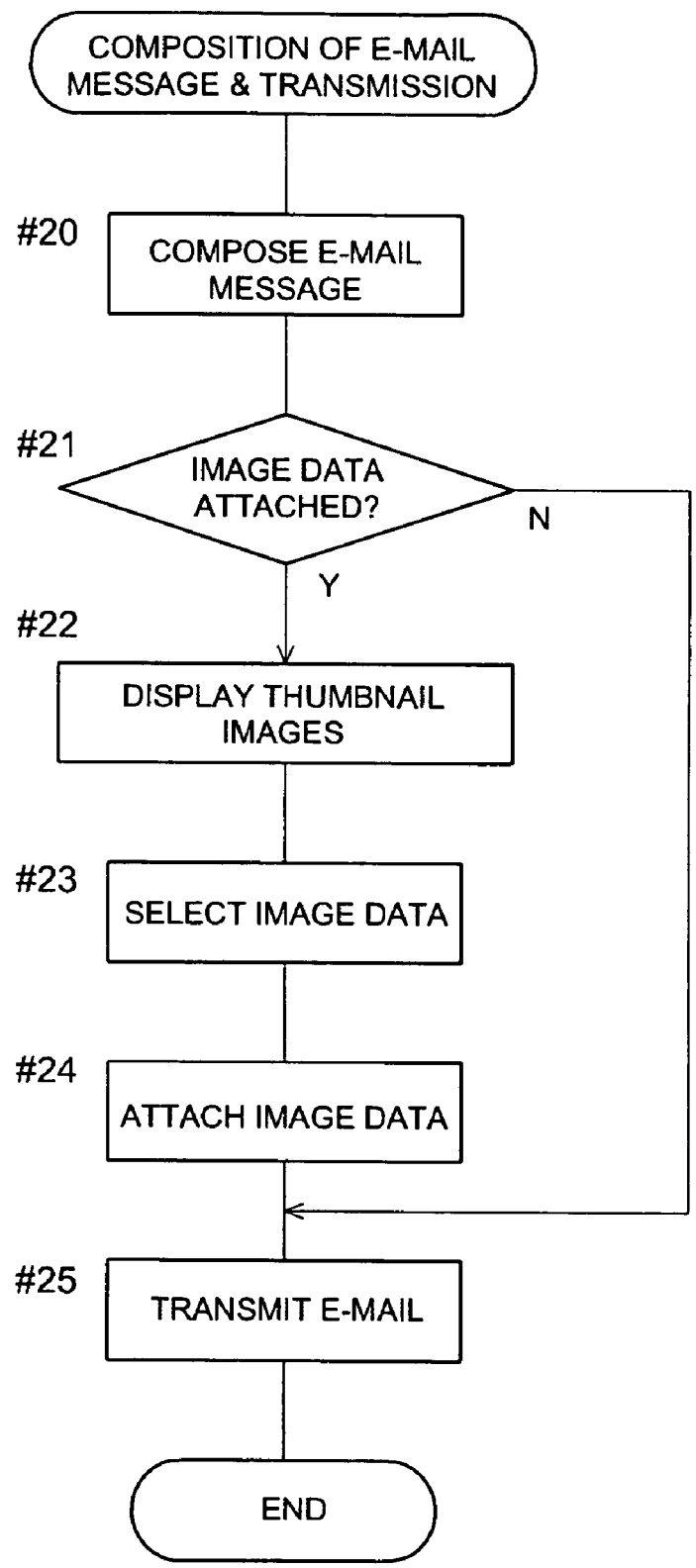
FIG. 11 is a flowchart showing an outlined flow of processes performed by the mobile telephone when an e-mail message is composed and transmitted.

A simplified flow of processes when an e-mail message is composed and transmitted is shown in FIG. 11. First, an e-mail message is composed according to user's input operations (step #20). During these operations, a recipient e-mail address is set. Next, a checking is conducted to see whether or not there is an instruction for attaching image data to the composed e-mail message (#21). When there is no instruction for attaching the image data, then the e-mail message alone is transmitted (#25).

When there is an instruction for attaching the image data, then the thumbnail images arranged in a list view is displayed (#22). In this step, the thumbnail images are displayed regardless of whether the original image data thereof represents a 2D image or a 3D image. Then, the image data designated by the user is selected (#23). In doing so, only those image data that can be attached are made selectable by deciding, in advance, image data that can be attached to the e-mail message depending on the dimension of image, the copyright, or the like. Finally, the image data is attached to the e-mail message (#24) and transmitted (#25).

Figure 12:
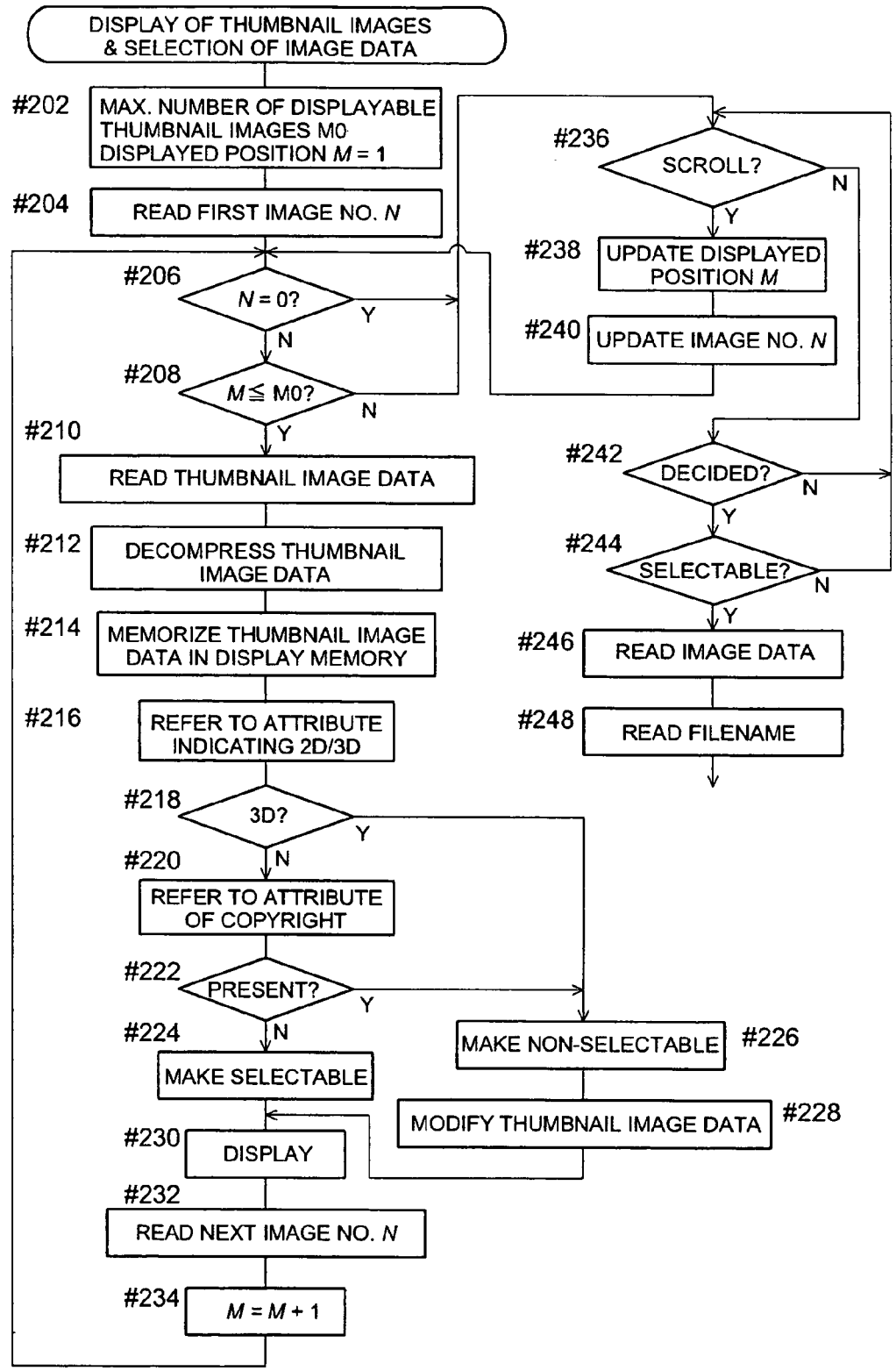
FIG. 12 is a flowchart showing detailed processes performed in steps #22 and #23 among the processes concerning e-mail shown in FIG. 11.

The processes in steps #22 and #23 are shown in more details in FIG. 12. First, a maximum number M0 of thumbnail images displayable simultaneously on the display section 17 is set and a displayed position M of the thumbnail image is set to "1" (step #202). For example, if three-by-three images arranged horizontally and vertically are to be displayed, M0 is set to "9." In this case, the displayed position at right end center is 6. Thereafter, the first image number N is read from the work memory 19 (#204).

Then, the image number N is checked whether or not it is "0" (#206). If it is not "0", then the displayed position M is checked whether or not it is equal to the maximum number M0 or less (#208). If the displayed position M is equal to the maximum number M0 or less, the image data for the thumbnail image having the image number N is read from the storage memory 20 (#210), decompressed (#212), and memorized in an area corresponding to the displayed position M in the display memory 18 after the decompression (#214).

Thereafter, the Nth. management information in the work memory 19 is referred to (#216) and the attribute indicating 2D or 3D is determined (#218). When the attribute indicating 2D or 3D indicates "2D", the Nth. management information in the work memory 19 is referred to (#220) and the attribute of copyright is determined (#222). If the information regarding the attribute of copyright indicates that the copyright is "not present", the Nth. image data is made selectable (attachable to e-mail) and the information indicating this is memorized in a predetermined area in the work memory 19 (#224).

When the attribute indicating 2D or 3D indicates "3D" as a result of the determination in step #218, or when the attribute of copyright indicates that the copyright is "present" as a result of the determination in step #222, the Nth. image data is made non-selectable (#226). Furthermore, in order to clearly show that it is non-selectable, the image data in the display memory 18 is modified so that data representing an oblique line is added thereto (#228).

Following these processes, the display section 17 displays using all the data memorized in the display memory 18

(#230). By doing so, a number of thumbnail images equal to a number of processes performed in step #214 are displayed. After that, the next image number N is read from the work memory 19 (#232), the display position M is incremented by 1 (#234), and the flow returns to #206.

When the image number N is determined that it is "0" in step #206, in other words, when the thumbnail images of all the image data have been displayed, or when the display position M is determined that it exceeds the maximum number M0 in step #208, in other words, when there is no more surplus position for displaying the thumbnail images, then it is determined whether or not a scrolling instruction for display is entered by operating the operation section 14 (#236). When there is an instruction for scrolling, the display position M is updated in response thereto (#238) and the image number N is also updated (#240). For example, when three thumbnail images laid side by side horizontally are being displayed, the display position M is either incremented or decremented by 3. Thereafter, the flow returns to step #206.

When there is no instruction for scrolling, it is determined whether or not an instruction for a decision is made (#224). This instruction is given when the user operates a predetermined key on the operation section 14. Moreover, the user, prior to giving the instruction, positions the cursor on the thumbnail image to be selected on the display section 17 by operating the cursor keys of the operation section 14. When there is no instruction for the decision, then the flows returns to step #236.

When there is an instruction for the decision, then the information memorized in steps #224 and #226 and corresponding to the image number of the image displayed in a cursor position is read from the work memory 19, and, based on the information, it is determined whether or not the image is selectable or non-selectable (#224). When the image is non-selectable, the flow returns to step #236. When the image is selectable, the image data for that image number is read from the storage memory 20 (#248), and at the same time, the filename thereof is read from the work memory 19 (#248). Thereafter, in step #24 shown in FIG. 11, thus retrieved image data is given the retrieved filename and is attached to e-mail.

Figure 13A:
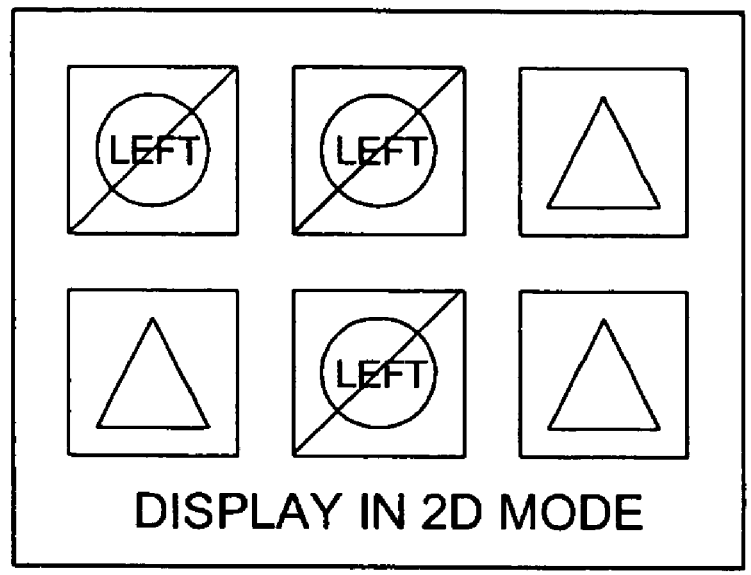
FIGS. 13A and 13B are diagrams showing examples of thumbnail images displayed on the mobile telephone when image data to be attached to e-mail is selected.
Figure 13B:
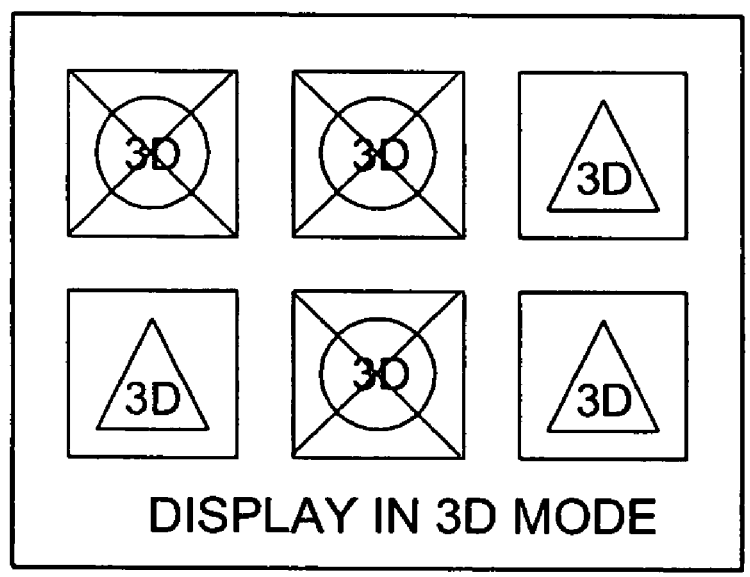

Examples of thumbnail images represented by the image data that are modified in step #228 are shown in FIG. 13A and FIG. 13B. FIG. 13A shows the thumbnail images shown in FIG. 6C with addition of an oblique line and FIG. 13B shows the thumbnail images shown in FIG. 6E with addition of an oblique line. It is possible, by adding an oblique line in this way, to distinguish the image data that are prohibited from being attached to e-mail. Alternatively, it is also possible to distinguish the image data that are prohibited from being attached by adding other indicators such text as "not allowed." Furthermore, it is also possible to distinguish the image data that are prohibited from being attached by making the images colorless in black and white. In addition, when the thumbnail images arranged in a list view are displayed for displaying images only and not for the purpose of attaching images to e-mail, as shown in FIG. 6A to FIG. 6E, an oblique line or the like meaning that the image is prohibited from being attached is not displayed.

Examples of judgment criteria for determining whether or not the image can be attached to e-mail are shown in FIG. 14. Among image data created by the JPEG method, those that are for 2D and obtained through the Internet usually have information concerning the copyright added thereto and are judged not attachable based on the attribute of copyright thereof Furthermore, as the 2D image data obtained by photographing using the image sensing section 15 are determined whether or not they are attachable based on the attribute of copyright and the attribute indicating 2D or 3D thereof, they are judged attachable based on the attribute indicating 2D or 3D and the attribute of copyright as well. However, because the mobile telephone 1 has a function of adding information concerning copyright to the image data representing the photographed image by using the image sensing section 15, the image data is judged not attachable based on the attribute of copyright when the user added thereto information concerning the copyright.

Among image data produced through the JPEG method, those image data that are for 3D and obtained through the Internet usually have information concerning the copyright added thereto and are judged not attachable based on the attribute of copyright thereof either. Moreover, even if the information concerning the copyright is not added and the image data is judged attachable based on the attribute of copyright, it is judged not attachable based on the attribute indicating 2D or 3D. Additionally, image data (extension of filename is STJ) produced from 2D image data by using the 3D conversion function is judged not attachable based on the attribute indicating 2D or 3D. This is because mobile telephones capable of displaying 3D images are not in widespread use and as a result, it is highly probable that the 3D images will be wasted even if they are transmitted thereto.

Image data (extension of filename is NVA) for electronic animation, regardless of whether or not it represents a 2D or a 3D image, is judged not attachable based on the attribute of copyright or the image type thereof Even if the image data is judged attachable based on the attribute of copyright, the image data for electronic animation is always judged not attachable because the type of image thereof is always NVA.

Moreover, the mobile telephone 1 memorizes in the storage memory 20 thereof a several pieces of electronic animation image data having a blank center portion, i.e., comprising only a fringe image portion, and has a function of superimposing these data with the image data of images photographed by using the image sensing section 15 and displaying the superimposed image data so that the fringe portion thereof equivalent to the frames moves smoothly. Although there are image data for 2D and 3D among these electronic animation image data, either of the image data is judged not attachable to e-mail based on the type of image (NVA) thereof This is because mobile telephones capable of displaying the electronic animation images, as is the case for 3D images, have not come into widespread use yet, and accordingly, it is highly probable that the electronic animation images will be wasted even if they are transmitted.

As described previously, the mobile telephone 1 is capable of communicating with other devices such as a personal computer through a cable connected to the external device interface 16 (refer to FIG. 1). Information that can be transmitted to another device during the communication also includes the image data. In this case, a similar judgment as made with regard to the attachment files to e-mail is also made on whether or not the image data is allowed to be transmitted. This way makes it possible to securely protect the copyright of an author of the image data and avoid a wasteful transmission.

Note that, although the embodiment described here deals with a mobile telephone taken as an example of electronic apparatuses that can deal with image data representing a 3D image, it is to be understood that not only is the present invention applied to the mobile telephone but also to other types of mobile apparatuses such as a mobile information terminal as well as various types of electronic apparatuses having a displaying function.

Obviously, many modifications and variations of the present invention are possible in light of the above teachings. It is therefore to be understood that within the scope of the appended claims, the invention may be practiced other than as specifically described.

What is claimed is:

1. An electronic apparatus for obtaining and memorizing image data representing an image and displaying the image represented by the memorized image data, comprising:
- a communications section that externally obtains image data having a filename and representing an image;
- a controller that analyzes information attached to the filename and the image data, extracts the information as attributes including dimensional information of the image data, and produces, from the image data, thumbnail image data representing a thumbnail image;
- a first memory that memorizes, as a single file, the image data, the attributes of the image data, and the thumbnail image data together;
- a second memory that is provided separately from the first memory and further memorizes the attributes of the image data; and
- a display section that displays the image represented by the image data in a two dimensional mode or a three dimensional mode for stereoscopic view utilizing image data for left eye and image data for right eye, respectively, according to whether dimensional information included in the attributes memorized in the second memory represents a two dimensional image or a three dimensional image.

2. The electronic apparatus as claimed in claim 1, wherein the communications section obtains the image data via the Internet.

3. The electronic apparatus as claimed in claim 1, further comprising:
- a camera for photographing the image so that the image data is obtained by the camera.

4. The electronic apparatus as claimed in claim 1, further comprising:
- an audio input section for inputting audio; and
- an audio output section for outputting audio, wherein the communications section transmits and receives audio, and the electronic apparatus functions as a telephone.

5. The electronic apparatus as claimed in claim 1, wherein the attributes of the image data further include a type of the image, an attribute of copyright for the image, the filename of the file, and an image size expressed in numbers of pixels constituting the image in horizontal and vertical directions respectively.

6. The electronic apparatus as claimed in claim 5, wherein the image includes an image for electronic animation.

7. An electronic apparatus for obtaining and memorizing image data representing an image and displaying the image represented by the image data thus memorized, comprising:
- a communications section that externally obtains image data having a filename and representing an image;
- a controller that analyzes information attached to the filename and the image data, extracts the information as attributes including dimensional information of the image data, and produces, from the image data, thumbnail image data representing a thumbnail image;
- a first memory that memorizes, as a single file, the image data, the attributes of the image data, and the thumbnail image data together;
- a second memory that is provided separately from the first memory and further memorizes the attributes of the image data; and
- a display section that displays thumbnail images represented by the thumbnail image data stored in the first memory in a list view in a mode selected from a two dimensional mode and a three dimensional mode and displays the image represented by the image data in a two dimensional mode or a three dimensional mode for stereoscopic view utilizing image data for left eye and image data for right eye, respectively, according to whether dimensional information included in the attributes memorized in the second memory represents a two dimensional image or a three dimensional image,
- wherein, if the image data represents a two dimensional image, the controller is capable of generating three dimensional image data from the image data representing a two dimensional image by extracting every other set among sets each comprising R pixel data, G pixel data, and B pixel data from the image data so as to make image data for a left eye, and, then, image data for a right eye is produced by positioning each set comprising R pixel data, G pixel data, and B pixel data included in the image data for the left eye in such a way that said each set is shifted in a horizontal direction according to its situation.

* * * * *